A. M. RAVILLY.
NUT LOCK.
APPLICATION FILED JAN. 2, 1908.

915,217.

Patented Mar. 16, 1909.

Witnesses:

Inventor
Alfred Marie Ravilly.
By ___ Attorney

UNITED STATES PATENT OFFICE.

ALFRED MARIE RAVILLY, OF ASNIÈRES, FRANCE.

NUT-LOCK.

No. 915,217.　　　Specification of Letters Patent.　　Patented March 16, 1909.

Application filed January 2, 1908. Serial No. 409,064.

*To all whom it may concern:*

Be it known that I, ALFRED MARIE RAVILLY, a citizen of the French Republic, and resident of Asnières, France, have invented certain new and useful Improvements in Nut-Locks, of which the following is a specification.

This invention relates to nut locks its object being to provide a device of this kind which will be efficient in use and very simple in construction.

Figure 1:
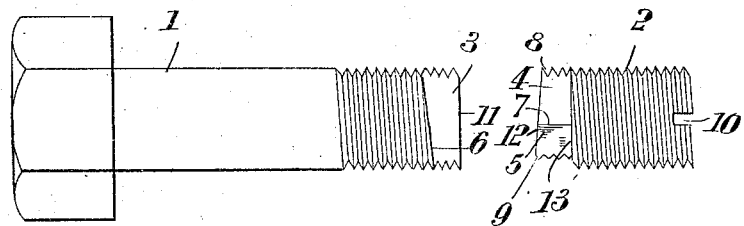
Figure 2:
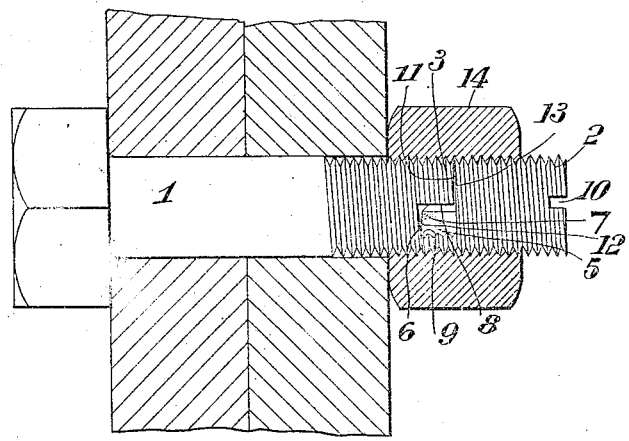
Figure 3:
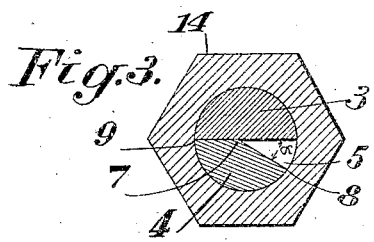
Figure 4:
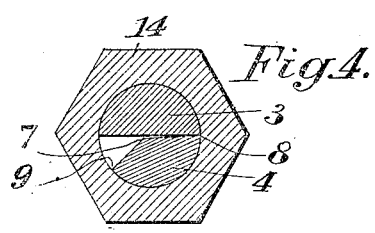

In the annexed drawings: Figure 1 is a side elevation view of a bolt provided with my nut lock this bolt being made of two parts the right hand one of which is shown rotated 180° with reference to the position which it should occupy when the two parts are juxtaposed end on end. Fig. 2 shows a similar view of same as well as a section of the nut and adjacent parts, in the position of untightening; Figs. 3 and 4 show respectively two cross sections of the assembled bolt parts and of the nut in the tightening and untightering positions.

As shown by the drawings, the bolt comprises two parts 1 and 2 which are screw threaded with the same pitch and their juxtaposed ends are cut away so as to leave on the part 1 a semi-cylindrical part 3 and on the member 2 a semi-cylindrical part 4 of which a cylinder sector is afterward cut away, as at 5, see Figs. 1, 2 and 3. The transverse faces 6 and 11 of the member 1 correspond to the faces 12 and 13 respectively of member 2. The faces 6 and 12 have even the same inclination of any suitable pitch with reference to the axis of the bolt. The above described cuttings are made in such a manner that the bolts having a diameter of 19 millimeters and less shall have four threads on one side of the section and three threads on the other side, on each cut away part which forms the sector 4 and the part 3; this bolt has been shown by Fig. 1. For bolts having 20 millimeters and more, the section will be made so as to leave ive threads on one side of the section and four on the other side of each sectioned part. The angle $a$ (Fig. 3) of the removed sector 5 may vary for bolts of different diameters from 38 to 50° and the face 7, 8 of the sector 4 could attain the number of 58 % of the diameter of the bolt. Finally the nut 14 should have a height which is one-third greater than that of ordinary nuts for a bolt of the same diameter When it is desired to tighten the nut, one exactly juxtaposes the two parts or members 1 and 2 which constitute the bolt and one screws the nut in place so that it covers the assembling joint of the parts or members 1 and 2. In the tightening position, the face 7, 9 of part 4 abuts against the plane face of the semi-cylindrical part 3 as shown by Fig. 3; the fixation is obtained without any difficulty; if it is desired to untighten or loosen the nut, the sector 4 will assume the position shown by Figs. 2 and 4; the part or member 2, in its rotary motion when the nut is untightened without intention, is forced to rise upon the incline 6 which has for its effect to displace the threads of the screw with reference to those of the nut, and to jam the threads thus preventing any motion of the nut.

When it is desired to untighten the nut without difficulty one introduces a screw driver into the slot 10 and holds thus the part or member 2 in its initial position, see Fig. 3, and the nut may be unscrewed without opposing any resistance.

The above described nut lock could be applied to the screw plugs or stoppers and for tightening wheels of carriages of any kind, at the end of the axles or of the naves.

Having now fully described my said invention, what I claim and desire to secure by Letters Patent, is:—

1. In a nut lock, the combination with a nut, of a bolt comprising two parts 1, 2, screw-threaded with the same pitch, the juxtaposed ends of said parts being cut away to leave a semi-cylindrical portion 3 on the part 1 and a semi-cylindrical portion 4 on the part 2, said portion 4 having a sector shaped section removed at 5 and providing a face 8 of a length slightly greater than the radius of the bolt, said part 1 having an inclined transverse face 6 and a non-inclined face 11 and the part 2 having the inclined face 12 and the non-inclined face 13, said faces 6 and 12 having the same inclination relatively to the axis of the bolt.

2. In a nut lock the combination with a nut, of a bolt having a diameter not exceeding 19 millimeters and comprising two parts 1 and 2, screw-threaded with the same pitch, the juxtaposed ends of said parts being cut away to leave a semi-cylindrical portion 3 on the part 1 and a semi-cylindrical portion 4 on the part 2, said portion 4 having a sector shaped section removed at 5 and providing a face 8 of a length slightly greater than the radius of the bolt, said part 1 having an inclined transverse face 6 and a non-inclined face 11 and the part 2 having the inclined face 12 and the non-inclined face 13, said faces 6 and 12 having the same inclination relatively to the axis of the bolt, the section of the adjacent ends of both parts 1, 2 comprising four threads on one side and three threads on the other as set forth.

In testimony whereof I have hereunto set my hand in presence of two witnesses.

ALFRED MARIE RAVILLY.

Witnesses:
 DEAN B. MASON,
 T. DELLREUCK.